Patented May 9, 1933

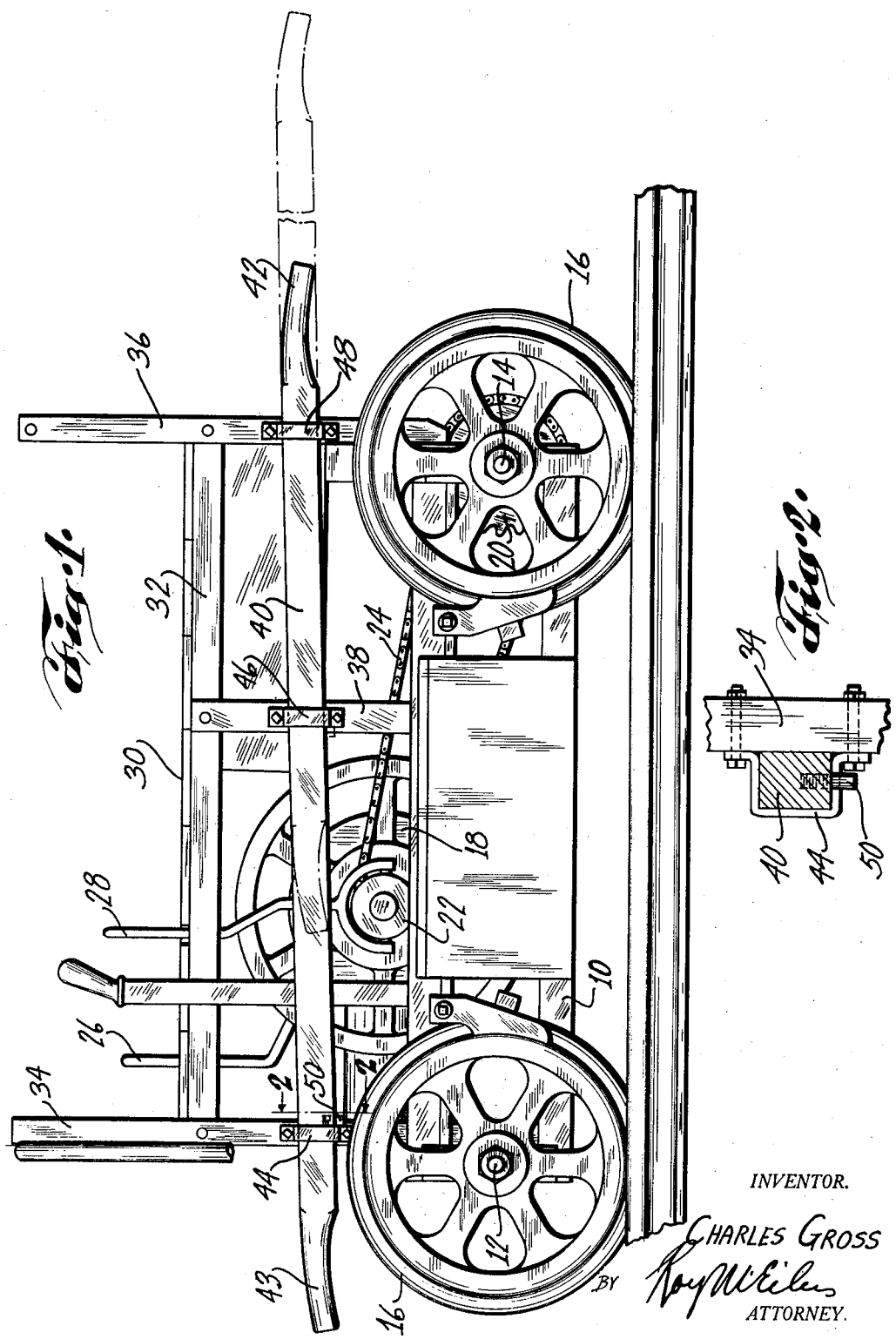

1,907,646

UNITED STATES PATENT OFFICE

CHARLES GROSS, OF THREE RIVERS, MICHIGAN, ASSIGNOR TO FAIRBANKS, MORSE & CO., OF CHICAGO, ILLINOIS, A CORPORATION OF ILLINOIS

RAILWAY MOTOR CAR

Application filed May 2, 1932. Serial No. 608,690.

This invention relates to improvements in railway motor cars, and more particularly to an improved means for handling a motor car in placing it on the track or removing it therefrom.

The object of this invention is to provide an improved arrangement of lifting handles for a motor car, such that the handles are each capable of being extended at only one end of the car, or placed in such a position as to be readily available for lifting purposes, on both ends of the car, the two positions being employed respectively, for lifting by one operator alone, or by several operators at opposite ends of the car.

A further object is found in a provision for mounting the handles on the car frame in such a manner as to result in a tendency of the handles, when extended, to return to their normal retracted positions, under the action of gravity and motion of the car.

Further objects and advantages will appear from the following description, and from the accompanying drawing, in which:

Fig. 1 is a side elevation of a railway motor car, showing the two positions of one of the lifting handles, the extended position being shown in dotted lines, and Fig. 2 is a fragmentary sectional elevation of one end of the handle showing one of the mounting brackets, and a pin stop.

Proceeding now with a description of the device, as here shown applied to a railway motor car of a type used in railway track inspection, and referring to the drawing by numerals of reference, 10 designates a car bed-frame which is supported upon car axles 12 and 14, and wheels 16, which may be of usual and prevailing construction. The motive power for the car is obtained from an engine 18, preferably of internal combustion type, which is connected with the axle 14 by sprocket gears 20 and 22, and chain 24. The engine and engine drive connection are controlled by the levers 26 and 28 respectively. An operator's seat 30 is mounted on a pair of longitudinally parallel side members 32 which are shown as extending the length of the car bed frame. The side members are secured to upright posts 34 and 36 in any suitable manner, such as by bolting the ends thereto. Upright brace members 38, positioned between the posts 34 and 36, and in proximity to the posts 36, are provided to give additional strength to the seat frame.

A pair of extensible lifting bars 40, having suitable grip end portions 42 and 43, are provided, one on each side of the seat frame, for aiding the operator in moving the car onto or off of the track. The bars may be formed from well seasoned hardwood, or any similar material suitable to the purpose, of such dimension as to have ample strength to support the weight of the car and its equipment, including the operator's track tools and apparatus. Substantially U shaped guide members 44, 48 and 46, bolted or otherwise secured to the upright members 34, 36 and 38, respectively, are provided to retain the bar 40 in endwise slidable relation on the car frame. As may be observed from Fig. 1, the bar 40 is mounted in an inclined position, the end 43 being lower than the end 42, as determined by the different heights at which the guide members 44, 46 and 48 are disposed. A pin stop 50 (Fig. 2), secured to, so as to project downwardly from the under-surface of the bar 40, is positioned so as to abut the inner edge of the guide member 44 when the bar is in its normal retracted position, as shown in full lines in Fig. 1. The limit of extension of the bar 40 is determined by the guide member 48, as in the fully extended position of the bar (shown in dotted lines, Fig. 1), the pin 50 abuts the lower side of the member 46. It will readily be seen that if it is desired to limit further the extensibility of the lifting bar, a second pin (not shown) may be secured to the bar between the guides 44 and 46, in such a position as to give the desired limitation of bar movement.

In the operation of the handle bars, if two or more operators are present, the car may be easily handled with the bars in their normal retracted position, as shown in Fig. 1, through lifting and moving effort applied by one or more persons at each end of the car. However, if only one operator is using the car, a greater leverage is at his disposal, for the purpose of placing the car on the track, or to remove it therefrom. The bars may, in this case, be extended by drawing them out into a position such as illustrated by the dotted lines in Fig. 1, thus giving sufficient leverage to enable a single operator to move the car with ease.

If the bars should be left in the extended position, when the car is started, the motion of the car due to inequalities in the roadbed and the like, will tend, automatically, to move the bars into their normal or retracted position, by reason of their slidable, inclined mounting on the car frame. This feature is primarily a provision for preventing accidents which may result from the bars being left in the extended position through carelessness or oversight on the part of the operator.

It will further appear that the pitch or inclined arrangement of handles tends to prevent, without the provision of springs or the like, any tendency of the handles to become unseated or shifted out of their positions of rest, due to sudden starting or stopping of the car, or due to vibration or movements of the car incident to its normal use.

It will, of course, be understood that this specification relates particularly to a single embodiment of my invention, hence to be understood only in a descriptive, and not a limiting sense, and that substantial modifications and alterations may be made without departing from the full intended scope of the invention, as defined in the appended claims.

I claim:

1. In a railway car of a type adapted to be manually moved on and off of a track, a lifting handle member disposed lengthwise of the car, and means for guidingly carrying said handle member in pitched relation toward one end of the car.

2. In a railway vehicle of a type adapted to be manually placed on and off of a track, a car body, extensible handles disposed at the sides of the car body, handle guides carried by the car body and relatively so disposed as to keep the handles in other than a horizontal position.

3. In a railway motor car, a car body, handles carried laterally of the car body, and movable lengthwise thereof, and guides for the handles arranged to keep the handles pitched toward one end of the car.

4. In a railway motor car, a car body, lifting handles at opposite sides of the car body, and movable lengthwise thereof, the handles being sloped with respect to the car body, toward one end thereof.

5. In a railway motor car, a car body, lifting handles of a length to project from opposite ends of the car body so as to permit concurrently lifting both ends of the car, and handle guides carried by the body, permitting the handles to be drawn to project from only one end of the car, the guides being arranged to pitch the handles toward the opposite end of the car.

6. In a motor car of the class described, a car frame, a raised operator's seat, upright supporting members for said seat, a pair of lifting bars extending longitudinally of the car frame, and substantially U shaped guide members for said bars, said guide members being secured to said upright supporting members in vertically staggered relation.

7. In a railway motor car, a car frame, an operator's seat, supporting posts for said seat, guide members on said supporting posts, and a pair of parallel bars, one for each side of the car frame, capable of longitudinal sliding movement in said guide members, the plane of the parallel bars being at an angle to the horizontal plane of the car frame.

8. In a railway motor car, a car frame, a raised seat extending longitudinally of said car frame, a seat supporting structure, handle bars, means on said seat supporting structure, and extending laterally therefrom for mounting said bars in an inclined position relative to the car frame, said means permitting longitudinal sliding movement of the bars.

CHARLES GROSS.